April 7, 1959     H. E. FROEHLICH     2,880,946
BALLOON AND FITTING FOR BALLOON ENDS
Filed Nov. 3, 1954
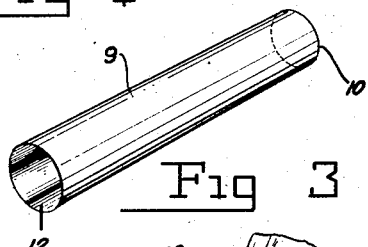
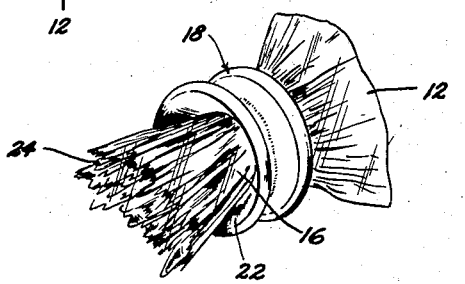
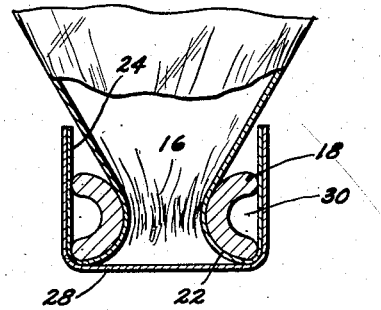
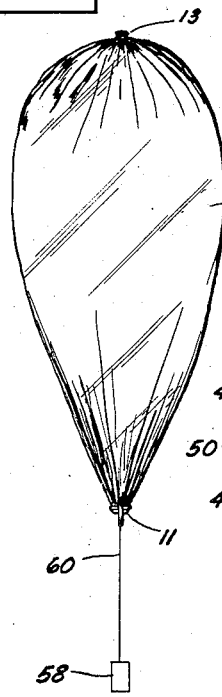
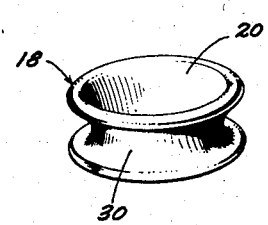
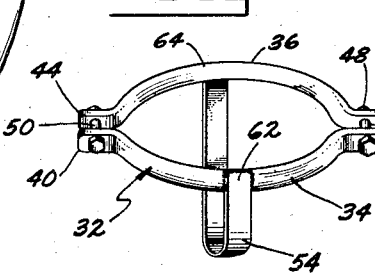
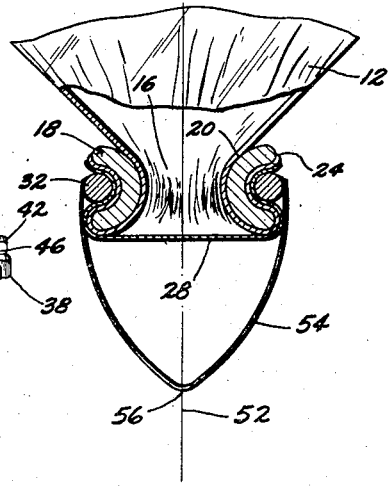
INVENTOR.
Harold E. Froehlich
BY
William C. Stueber
ATTORNEY 
United States Patent Office 2,880,946
Patented Apr. 7, 1959

2,880,946

BALLOON AND FITTING FOR BALLOON ENDS

Harold E. Froehlich, New Brighton, Minn., assignor to General Mills, Inc., a corporation of Delaware Application November 3, 1954, Serial No. 466,630

4 Claims. (Cl. 244—31)

This invention relates to improvements in balloons and more precisely to an end fitting for securing the top and bottom ends of a tapeless or shroudless type balloon.

Developments in the balloon art and balloon materials have made possible very high altitude balloon flights with the use of light weight tough thermoplastic materials which are not affected by low temperatures and which have a very low permeability to gas.

For high rates of rise the balloons are streamlined in shape and have a large fineness ratio, this being the term used to indicate the ratio of length to diameter. To obtain this shape balloons have been fabricated from a series of shaped gores with the gores joined to each other along the seams.

For balloons having the maximum ratio of volume to surface area, spherical shapes or sphere shapes with a conical bottom have been used. To obtain these shapes these balloons are also usually fabricated from a series of gores joined to each other along the edges.

It has been found that the above type balloons usually require some type of load carrying member such as tapes, lines or shrouds, the reason for this being that there is insufficient balloon material near the top and bottom to withstand the stresses caused by the loads involved. These tapes add considerable weight to the balloon, reducing its performance level, and take considerable manufacturing time to attach.

There is another type of balloon that has recently been established. This balloon has a number of advantages including the elimination of horizontal stresses in the material and eliminating the necessity of load tapes. This balloon is known as a "natural shape" balloon. The balloon is so called because the shape is determined not by the tailoring but by the natural shape of the gas bubble within the balloon, determined in part by the ratio of fabric weight to gross load. In practice, there are an infinite number of natural shapes depending on the distribution of all the fabric weight and payload. Without going into specific detail, the natural shape balloon may be described as a balloon which has enough material to permit the gas bubble to take its natural shape.

Some natural shape balloons are made from rectangular longitudinal gores resulting in a cylinder of material which is collected or gathered together at both ends to form the balloon. When inflated, the diameter of this balloon is dependent only on the amount and distribution of all the weight involved provided the cylinder is as large or larger than the "natural" diameter. These so-called "cylinder" balloons may or may not have load carrying members (e.g. tapes). If no load carrying members are provided, the weight of the load is carried by the balloon material. Usually sufficient material or fabric is provided to carry the gross load and these balloons are tapeless or shroudless. These cylindrical balloons have meridional (vertical) folds everywhere except perhaps at the maximum diameter. This means that when fully inflated the circumferential tension is zero and that all tension in the fabric is meridional. This is sometimes called polarization of stresses. The fact that stresses are in one direction only greatly simplifies the designer's problems and aids manufacturing greatly.

There are modifications of the natural shape concept. It is possible to predict this shape and exactly tailor a balloon to meet this shape. When this is done, it is necessary to add load carrying devices near the top and bottom because the amount of load carrying fabric approaches zero in these regions. The load carrying members can be tapes, lines, or cables. However, in view of the extra weight added by these members and the time required to attach them, there are advantages in not using these members but instead using an excess of balloon material at the ends which has sufficient strength to support the load. If this latter is done, the balloon may be called a semicylinder or tailored tapeless balloon. Thus with either the full cylinder or the tailored balloon, there is an excess of material at the balloon ends which must be in some way connected to the load so that the weight of the load will be evenly distributed to the balloon material.

Most of the balloons are essentially non-extensible, usually being formed of light weight plastic. For this reason these balloons usually are only partially inflated when at or near sea level. This introduces the problem of fabric distribution especially in the balloons where extra fabric has been introduced to carry the load. The load must be carried by the balloon material at the balloon ends. When the balloon is partially inflated only a portion of the material at the top end carries the load. This means that the material must terminate in a manner such that this load does not introduce severe stress concentrations.

Concentrations of stress will stretch and tear the balloon material, cause leaks, or result in large tears which may and have caused balloon flight failures.

Previous methods of attachment have pleated the material evenly around a horizontally positioned annular ring with the load suspended from load lines. It has been discovered that large concentrations of stress occur and the ring may not remain horizontal because only a portion of the circumference is loaded. Further, this arrangement of attaching the balloon material to the ring is a time-consuming job.

It is an object of the present invention to present a new concept of attaching large amounts of fabric to a fitting. The new concept is that of bringing the material as nearly as possible to a point and thus eliminating or greatly reducing stress concentrations. When this point principle is embodied the material is free to distribute itself from this point in its own natural way, and large stress concentrations cannot occur as the result of fitting assembly or the position of the fitting in flight.

It is an object of the present invention to provide an end fitting for a balloon which meets the problems discussed above and enables taking advantage of the features of natural shape balloons and especially balloons which have no load tapes or shrouds but are provided with excess material to support the load.

It is an object of the invention to provide an improved method and apparatus for securing the end or ends of a balloon which will prevent large concentrations of stress and damage to the balloon envelope.

It is a further object to provide an improved fitting for closing the end or ends which is capable of completely sealing the balloon to prevent any leakage and which also provides means for attaching a payload to the balloon.

Another object of the invention is to provide an improved end fitting for the lower end of a balloon which will draw the material together at a common point which is coincident with the vertical axis of the balloon and which will support the load at a point which is below the fitting at the balloon axis.

Another object of the invention is to provide a fitting which will function to both close the end of the balloon and support a payload from the balloon, which is simple and inexpensive to manufacture, is expendable with the balloon, and is light weight and simple to attach and use in the field.

Other objects and advantages will become apparent in the following specification and claims taken in connection with the appended drawings in which:

Figure 1 is a perspective view of a cylindrical type balloon envelope on which the end fitting of the present invention may be used;

Fig. 2 is a perspective view illustrating a means of gathering together the material at the lower end of the balloon in preparation for attaching the end fitting;

Fig. 3 is a perspective view illustrating the lower end of the balloon after one element of the end fitting has been attached to the balloon;

Fig. 4 is a detailed view in vertical section taken through the center of the end fitting at the bottom end of the balloon and illustrating the material as held by the end fitting;

Fig. 5 is a vertical sectional view taken through the lower end of the balloon showing the complete end fitting attached to the balloon;

Fig. 6 is a perspective view of one element of the end fitting;

Fig. 7 is a perspective view of another element of the end fitting; and,

Fig. 8 is a perspective view illustrating a balloon in flight using the end fitting of the present invention.

The end fitting of the present invention is not limited to natural shape balloons since it could be used with sphere or sphere cone balloons, balloons with large fineness ratios, various taped balloons or combinations of the above types. One of the important advantages, however, lies in the fact that it makes it possible to use extra material at the balloon ends to take the stress of the load and thereby helps eliminate the need for tapes or shrouds.

Although the end fitting is well suited to these various types of balloons, for ease of description the illustrated preferred embodiment will be described as used with a cylindrical type balloon envelope.

Figure 1 illustrates an uninflated balloon envelope 9 of the cylindrical type which is well adapted to use with the end fitting of the present invention. Figure 8 illustrates this balloon envelope with the top closed at 13 and an end fitting 11 attached at the lower end with the envelope inflated to form a load carrying balloon 19. The balloon envelope 10 of Figure 1 may be referred to as the cylindrical or tapeless type.

In the present cylindrical type balloon, no tapes are used and the weight of the payload is carried directly by the balloon material. To accomplish this, sufficient material must be present at the ends of the balloon to carry the entire load. That is, there must be sufficient square inches of material so that the unit stress is below the ultimate or breaking stress of the balloon. Although this extra material is not needed to provide balloon volume for gas inflation, the extra weight of the balloon material provided for load support is less than the weight of tapes used with a gore type balloon.

This excess material presents some problems in that a way must be devised of connecting the material to a load in a manner so that the weight of the load will be very evenly distributed to the material because, as above described, any uneven load distribution may cause a unit stress in one section of the material which exceeds the ultimate stress of the material and will cause a failure of the balloon envelope. In the load tape type of balloon, the gores are so shaped that the balloon tapers to a point at the lower end and therefore the end of the balloon is easily sealed off such as by merely attaching a valve. In the tubular type balloon, the necessity of attaching a load to the material in a manner so that its weight will be evenly distributed and the abundance of material make it difficult to seal the bottom of the balloon.

The present invention proposes evenly gathering the excess material and bringing it together to a common concentrated point which is coincident with the vertical axis of the balloon. The end fitting holds the gathered material together at this common point and is clamped to the material. The load is supported from this same clamp and fitting and is supported directly beneath it with its center of gravity at the vertical axis of the balloon.

The balloon envelope 9 of Figure 1 is shown generally as cylindrical in shape and may be formed of a series of rectangular gores which are attached to each other at their edges. In a modified or tailored cylindrical balloon, some of the gores may be tapered at their ends to give the envelope greater fullness in the center. The balloon envelope may be formed of a length of seamless material as it is extruded when manufactured. The limiting factor of shape is that there must be sufficient material at the ends 12 of the balloon envelope to carry the balloon load without exceeding the unit yield stress of the material.

Fig. 2 illustrates a method of gathering the material of the lower end of the balloon envelope. The material may be drawn together evenly and grasped as by hands 14 about a point which will be coincident with the central axis of the balloon. If during the gathering or bunching of the material 16, it is pulled away from the balloon body the material will be bunched at the proper point and an equal tension will be applied to all the material around the balloon when full.

To secure the bunched material 16 of the lower end 12 of the balloon envelope, a small annular ring or gathering 18 is slipped over the material. This ring is sufficiently small so that the material will be held tightly together. The annular ring 18, Figs. 3 and 7, has a smooth inner surface which diverges outwardly from the center to form a rounded sloping surface 20 at the upper end and at 22 at the lower end.

The smooth diverging surface at the upper end permits the balloon material 12, Fig. 5, to flare outwardly toward the inflated balloon envelope without passing over sharp edges which would cause concentrations of stress.

To keep the annular holding ring in place on the balloon the material is forced firmly against its surface. In the present embodiment, apparatus is provided which clamps the material to the outer surface of the ring 18. To this end, the lower edge 24 of the material which projects through the annular securing ring 18, is brought up around the outer surface of the ring in the manner shown in Fig. 4 and lies smoothly against the diverging lower surface 22 of the ring.

It will be seen from Fig. 4 that the bunched material 16 substantially closes the inside of the annular ring 18 and although the material is gathered somewhat tightly therein, some gas might escape through the folds of the bunched material at the lower end. To prevent this, the preferred embodiment utilizes a sheet 28 or diaphragm of material drawn over the lower surface of the ring 18. This material is then brought up around the outer surface of the ring to cover the balloon material which was previously wrapped over the outer surface.

The material then is secured to the ring by being clamped tightly against its outer surface. This, of course, also holds the ring tightly in position on the end of the balloon so that it may be used to support the payload from the balloon.

To this end, the annular ring is provided on its outer surface with an annular groove 30 into which the material may be forced. A clamping member 32, shown in detail in Fig. 7 and shown in position on the balloon in Fig. 5, is provided to clamp the balloon material in the groove. This clamping member consists of an annular ring divided into two halves 34 and 36 which have outwardly extending projections at the ends of the half. The half 34, for example, has a projection 38 at one end and another projection 40 at the other end. The half ring 36 has a projection 42 at one end and a projection 44 at the opposite end. Projection 38 of ring 34 matches projection 42 of ring 36 and a bolt 46 extends through holes in these projections. Tightening the nut 48 on the bolt will draw the projections together and hence draw the two rings together to a smaller diameter. Another bolt 50 extends through holes in the matching projections 40 and 44 to draw the other side of the two rings together.

When the ring 34 is in position over the groove of the annular ring 18 the bolts are tightened and the material 24 of the lower end of the balloon and the edge of the sheet 26 are forced tightly into the groove to completely seal the lower end of the balloon and firmly attach both the ring 18 and the clamping ring 32 to the balloon as is shown in Fig. 5.

Thus it will be seen that the material of the lower end of the balloon is concentrated and held together at a single point which lies on the axis 52 of the balloon. This point concentration principle insures an equal distribution of the weight of the load to the balloon material at the ends of the balloon. With the point attachment principle the position of attachment of the ring is easily and readily controlled such as by merely grasping the material as is shown in Fig. 2 and the material is thereafter easily secured by adding the ring as described.

The end fitting embodying the principles of the present invention supports the load from the same fitting which secures the balloon material and supports the load directly beneath the point at which the material is concentrated.

Supporting the load a yoke 54 extends across the two sections 34 and 36 of the load ring as is shown in Figs. 5 and 6. The yoke tapers to a point 56 at the lower end when the load 58 is attached by means of the load line 60, Fig. 8.

The ends of the yoke are appropriately secured to the ring 32 such as by welding at the points 62 and 64 to the ring 32.

Thus with the yoke 54 centrally located with respect to the ring 32 the load will be supported directly beneath the ring and its center of gravity will be coincident with the vertical axis of the balloon which extends through the center of the annular ring 18. In flight the load is transmitted directly to the small ring which is securely attached to the balloon and the load is thus evenly carried by the gathered material at the lower end of the balloon.

Although the end fitting is illustrated as used at the bottom end of a balloon, it is also useful as a fitting for closing the top end of a balloon, such as at 13 in Fig. 8. For use at the top end, the material around the opening is bunched or gathered the same as is shown in Fig. 2. The holding ring is then slipped over the gathered material and the material clamped against the ring to hold it firmly in place. The clamping member 32, of course, may have the yoke 56 omitted since there is no load to be attached.

The fitting is extremely simple in structure and design and is easily and readily attached in the field. The simplicity and inexpensiveness of the design make the fitting expendable with the balloon and this is especially advantageous for the type of balloon which is shroudless and tapeless. Although the specification and claims refer to a cylindrical balloon, it will be readily seen that the end fitting is not limited to use with this exact type of balloon and the term is not to be taken as limiting.

I have, in the drawings and specification, presented a detailed disclosure of the preferred embodiment of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim as my invention:

1. An end fitting for a balloon which may be inflated with a lifting gas for carrying a load to high altitudes, the balloon formed of a tubular section of material with the ends gathered together, the end fitting comprising a rigid annular ring for closing the bottom end, the lower end of the balloon material to be drawn through the center of the annular ring and held therein with the material folded back around the outer surface of said annular ring, a sheet of non-permeable material drawn across the lower face of the annular ring to prevent the escape of any gas which may leak through the material within the annular ring, and clamping means to fit the circumference of the annular ring for securing the edge of said sheet and the balloon material against the outer surface of the ring to secure the ring to the balloon, and means connected to said clamping means for supporting a payload on the balloon.

2. An end fitting for a balloon having a balloon envelope of light weight plastic material open at the bottom end with the end gathered tightly together about a common point, the fitting comprising a small annular ring for holding the gathered material, a clamping ring for clamping the material against the outer surface of said annular ring, the clamping ring being annular and being separated at one portion with tightening means spanning the separation to draw the ring to a smaller circumference for tightening it about the annular ring, and a yoke extending down from the clamping ring with the ends secured to the clamping ring to form a loop for supporting the load from the balloon.

3. An end fitting for a balloon, an envelope formed of light weight plastic material with an open lower end which is connected tightly together about a common point, the fitting comprising an annular ring for tightly surrounding the gathered balloon end, the ring having a smooth rounded inner surface to prevent damage to the light weight balloon material with the central opening diverging outwardly so that the balloon material may taper outwardly to the gas filled balloon envelope, the ring having an annular groove on the outer surface with the balloon material to be drawn upwardly to overlie the annular groove, an annular clamping band with means to draw the band together to a smaller diameter for clamping the material into said groove, and a load supporting yoke extending downwardly from the end fitting for supporting the load and having the ends of the yoke secured to the clamping band.

4. An end fitting for securing the end of a gas filled balloon envelope formed of lightweight thermoplastic material open at the lower end, the open end of the balloon envelope gathered together about a common point coincident with the axis of the balloon, the fitting comprising an annular ring through which said material passes and having an opening sufficiently large to squeeze together the gathered material, the material folded back over the outer surface of the annular gathering ring, a circular clamp clamped to the outer surface of the ring for holding the material against the outer surface of the ring, material means sealing the opening through the material gathered within the ring and secured by said circular clamp to prevent leakage of gas therethrough, and means secured to said clamping ring for supporting a load from the balloon.

(References on following page)

References Cited in the file of this patent

UNITED STATES PATENTS

| | | |
|---|---|---|
| 1,098,286 | Miller | May 26, 1914 |
| 1,303,098 | Merz | May 6, 1919 |
| 1,350,935 | Pastor | Aug. 24, 1920 |
| 1,649,594 | Johnson | Nov. 15, 1927 |
| 1,828,821 | Short et al. | Oct. 27, 1931 |
| 2,453,056 | Zack | Nov. 2, 1948 |
| 2,455,248 | Hagen | Nov. 30, 1948 |

FOREIGN PATENTS

| | | |
|---|---|---|
| 268,584 | Great Britain | Apr. 7, 1927 |
| 697,585 | France | Nov. 4, 1930 |